United States Patent

[11] 3,629,620

[72] Inventor Thaddeus Schroeder
Sterling Heights, Mich.
[21] Appl. No. 36,324
[22] Filed May 11, 1970
[45] Patented Dec. 21, 1971
[73] Assignee General Motors Corporation
Detroit, Mich.

[54] SINGLE LOGIC GATE MONOSTABLE MULTIVIBRATOR
3 Claims, 3 Drawing Figs.

[52] U.S. Cl. ........................ 307/273,
307/215, 307/218, 307/266, 328/58
[51] Int. Cl. ........................ H03k 3/26
[50] Field of Search ........................ 307/208,
215, 218, 234, 265, 266, 273; 328/58, 60, 61, 111, 112

[56] References Cited

UNITED STATES PATENTS

| | | | |
|---|---|---|---|
| 3,219,838 | 11/1965 | Hurst | 307/234 |
| 2,995,710 | 8/1961 | Beesley | 328/58 |
| 3,132,263 | 5/1964 | Maass | 307/218 |
| 3,231,765 | 1/1966 | Martin et al. | 307/265 |
| 3,501,649 | 3/1970 | Webb | 307/273 |

*Primary Examiner*—Stanley D. Miller, Jr.
*Attorneys*—E. W. Christen and C. R. Meland

ABSTRACT: A system for providing a series of output pulses from a series of input pulses wherein the pulse widths of the output pulses are equal to or less than the pulse widths of the input pulses. In this system a logic gate forms part of a monostable multivibrator providing an output pulse of a predetermined pulse width when constant-amplitude input pulses of indeterminate pulse widths exceeding the predetermined pulse width of the output pulses are supplied from a pulse source. When shorter pulse width input pulses are applied to the multivibrator, the output pulses have pulse widths equal to the pulse widths of the input pulses. To effect the desired operation, an RC timing circuit is connected with one input of a two-input gate element. The pulse source is connected to this gate input through the timing circuit and it is directly conductively coupled with the other input to the logic gate. In this manner, the input signals necessary for the creation of an output pulse are present for a time interval determined by the parameters of the timing circuit or the duration of the input pulse. Hence, output pulses are provided which have a pulse width equal to or less than the pulse widths of the input pulses.

Figure 1:
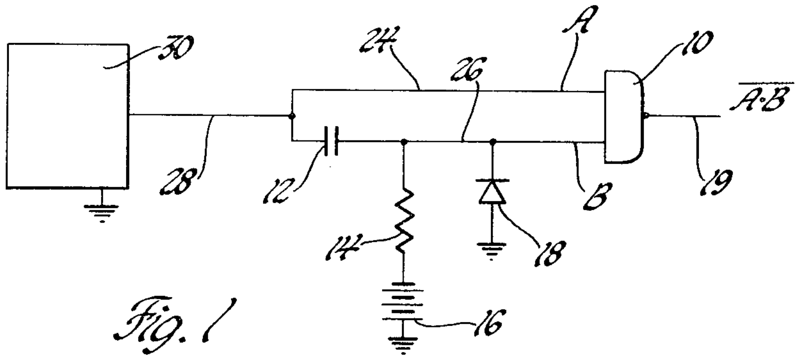

INVENTOR
Thaddeus Schroeder
BY
C. R. Meland
ATTORNEY

SINGLE LOGIC GATE MONOSTABLE MULTIVIBRATOR

This invention relates to a system wherein a logic gate is employed in combination with an RC timing circuit to provide a monostable multivibrator function. In the systems of this invention, a two-input logic gate is switched by constant-amplitude pulses having indeterminate pulse widths and an output pulse having a predetermined maximum width is provided at the output of the logic gate.

In a number of control applications it is desirable to produce a train or series of output pulses having a predetermined constant pulse width from a series of input pulses which may have variable pulse widths. It is further desirable, in certain applications, to provide a system wherein the pulse widths of the output pulses are uniform and of a duration which is less than the width of the input pulses.

In the past, monostable multivibrators have been utilized to provide constant-width output pulses from a series of input pulses. These monostable multivibrators have in general utilized switching devices and a feedback capacitor to determine the time duration of the output pulses. Typical examples of this type of system are shown in the U.S. patents to Rumble, U.S. Pat. No. 3,209,173 and to Heyning et al., U.S. Pat. No. 3,214,602.

In contrast to the type of multivibrators which use feedback capacitors it is an object of this invention to provide a monostable multivibrator circuit which uses a logic gate in combination with an RC timing circuit to provide a monostable multivibrator. The logic gate preferably is of the integrated circuit type which can be purchased as a small integrated circuit to therefore provide relatively small-size and relatively low-cost monostable multivibrators.

Another object of the present invention is to provide a monostable multivibrator wherein constant-amplitude input pulses of indeterminate pulse width are converted to output pulses having a lesser predetermined, substantially constant, pulse width by the action of a logic gate element in combination with an RC timing circuit.

Another object of this invention is to provide a monostable multivibrator including a logic gate circuit wherein indeterminate-width input pulses are converted to output pulses having a reduced predetermined pulse width wherein the output pulse width is variable over a range of values.

Still another object of this invention is to provide a monostable multivibrator wherein a logic gate element is employed with an RC timing circuit to convert constant-amplitude input pulses having indeterminate pulse widths to output pulses having pulse widths equal to or less than the pulse widths of the input pulses.

Additional objects and advantages of this invention will be apparent in light of the description presented herein. The following figures which are incorporated in the description disclose a preferred embodiment of the present invention.

In the drawings:

FIG. 1 is a block diagram of a monostable multivibrator constructed in accordance with the present invention.

Figure 2:
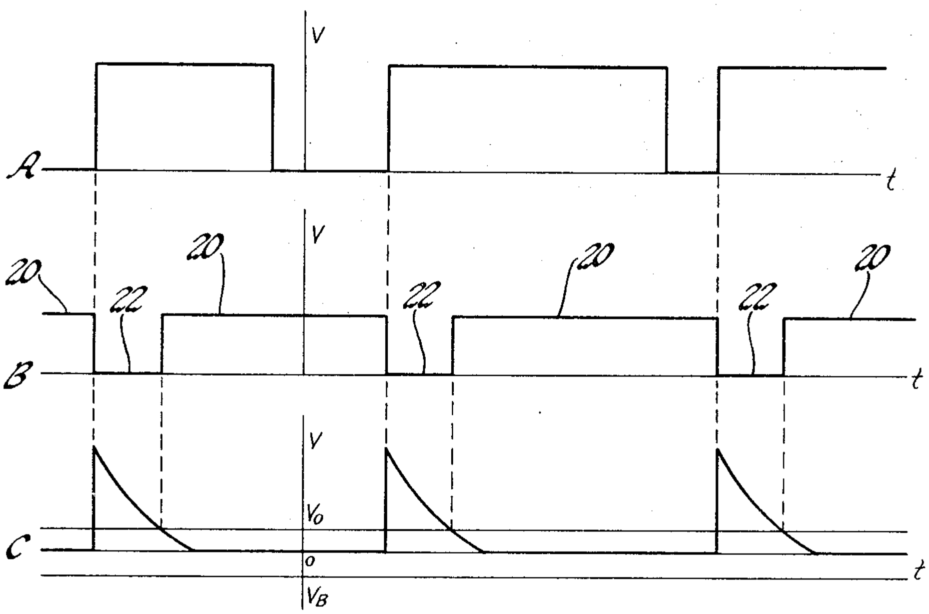

FIGS. 2A, 2B, and 2C are a set of curves related to the operation of the monostable multivibrator of FIG. 1.

Figure 3:
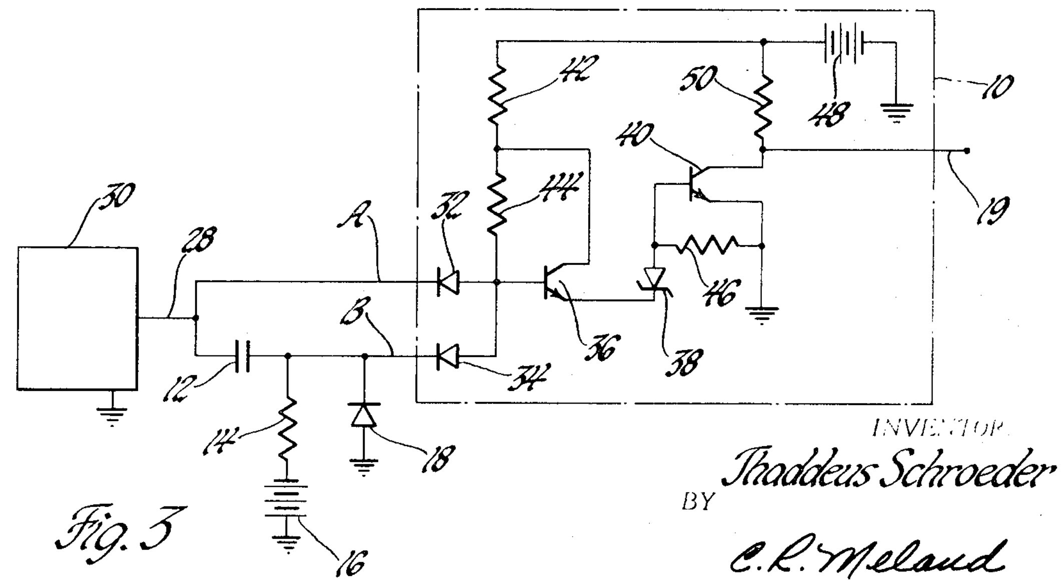

FIG. 3 is a circuit diagram of the monostable multivibrator shown in FIG. 1 wherein the logic gate element is shown as a specific NAND configuration.

Referring now to the drawings and more particularly to FIG. 1, a monostable multivibrator comprising a NAND gate 10, a capacitor 12, a resistor 14, a source of DC voltage 16 and a diode 18 is disclosed.

The NAND-gate 10 of FIG. 1 can take various forms but preferably is of an integrated circuit type such as that shown in FIG. 3 and more fully described hereinafter. This NAND-gate 10 has an output shown as $\overline{A \cdot B}$ on conductor 19 which maintains a high output value until and unless the voltages applied to the inputs denoted A and B both have a high value. This variation in output of the multivibrator is shown graphically in FIG. 2B. The portions denoted by reference numeral 20 are at the logic gate high-output value; whereas, the portions denoted 22 are at the logic gate low-output value.

When utilizing the NAND-gate 10 as a logic gate in the monostable multivibrator arrangement of this invention, it is necessary to regulate the input signals to obtain the desired output. To this end, the RC timing circuit comprised of capacitor 12 and resistor 14 together with the source of DC voltage 16 and the diode 18 are included as noted above and shown in FIG. 1.

The monostable multivibrator of FIG. 1 provides a single input on conductor 28 which is directly conductively coupled to input A of the NAND-gate 10 through conductor 24. Input B is connected through conductor 26 with capacitor 12 which in turn is connected with the input conductor 28. Since the RC timing network is interposed between the input conductor 28 and the input B, input signals applied between conductor 28 and ground are modified by action of the RC timing network prior to being applied to input B.

As noted above, the NAND-gate 10 provides a low output value only when inputs A and B of the NAND-gate 10 both are provided high input values. Accordingly, if either or both inputs A and B have an input value less than the threshold level, the output will be at the high output value. Accordingly, it is appreciated that when a rectangular input pulse having an amplitude greater than the threshold value for the NAND-gate 10 is applied between the conductor 28 and ground, there will be a low output value until the pulse applied terminates or the level of the voltage applied to input B is diminished to a value below the threshold level of the NAND-gate 10 by action of the RC timing network.

In FIG. 1, an input pulse source 30 supplies square wave pulses between conductor 28 and ground thus providing an input to the monostable multivibrator. The pulses available from this pulse source 30 are depicted graphically in FIG. 2A. The pulse source 30 should be of a type wherein pulses having indeterminate widths but constant amplitude are provided such as those shown in FIG. 2A.

Referring to FIG. 2C wherein the voltage applied to input B of the NAND-gate 10 is shown, it is noted that this voltage is generally the same as the characteristic curve associated with an RC timing network. It is noted that this curve illustrates the charging of capacitor 12 from the beginning of a pulse applied between conductor 28 and ground by the pulse source 30. Variations in the parameter values for the capacitive and resistive elements 12 and 14 will cause variations in the characteristic curve depicted in FIG. 2C. These variations depend on the RC time constant of the particular timing circuit. Bias voltage $V_B$ of FIG. 2C from the source of DC voltage 16 in FIG. 1 pulls down the flat portion of the characteristic curve of FIG. 2C so that the more rapidly changing portion of the curve is alone influential in the operation of the monostable multivibrator.

The diode 18 of FIG. 1 is provided to ensure that the input voltage applied to input terminal B by conductor 26 does not assume a negative value with respect to ground. This causes a truncation of the curve associated with the RC timing network. Accordingly, the slow-changing section of the characteristic RC curve does not appear at input B or in the curve of FIG. 2C.

Considering the operation of the monostable multivibrator, it is noted that an output pulse 22 of FIG. 2B is provided by gate 10 when the inputs to terminals A and B of the NAND-element 10 are both at their high value. This output pulse is at the low output value 22 of the NAND-gate 10. Accordingly, the output pulse is provided for that period of time during which the voltages applied to inputs A and B both exceed a threshold value $V_O$ shown in FIG. 2C. The voltage at input terminal A exceeds the threshold value as long as the input pulse (FIG. 2A) is at its high level while the voltage applied to input terminal B varies as a function of the RC time constant of resistor 14 and capacitor 12 as shown in FIG. 2C. At the beginning of an input pulse, the capacitor 12 permits a voltage to be applied directly to terminal B of the NAND-gate 10 which is above the threshold value $V_O$. As capacitor 12 charges through the resistor 14, the voltage on conductor 26 and therefore at the input B falls exponentially to a value below the threshold value $V_0$ necessary to maintain operation. When this happens the output pulse terminates and the output returns to its high output value 20 of FIG. 2B even though the input pulse is still available on conductor 28.

It is noted that the pulse widths of the input pulses of FIG. 2A are considerably greater than the pulse width of the predetermined pulse width output pulses of FIG. 2B. If an input pulse applied to input A terminates before the voltage applied to input B drops below the threshold value $V_0$ as determined by the RC time constant of capacitor 12 and resistor 14, the output pulse has a pulse width substantially equal to the pulse width of the input pulse.

In summary, it is noted that an output pulse on conductor 19 is caused by an input pulse on conductor 28. This output pulse (portion 22 in FIG. 2B) has a predetermined pulse width determined by the RC time constant of capacitor 12 and resistor 14 which is less than the pulse width of the input pulses providing the potential at input B drops below the threshold value $V_0$ before the input pulse terminates. In the alternative, if the input pulse terminates before the potential at input B drops below the threshold value $V_0$, the output pulse will have a pulse width substantially equal to the pulse width of the input pulse. The NAND-element 10 is employed to provide the necessary switching which creates the output pulse on conductor 19. The two inputs A and B of the NAND-gate 10 are provided with signals related to the pulse train on conductor 28. Input A is conductively connected with conductor 28 and input B is provided with a time-varying voltage from the timing circuit comprised of the capacitor 12, the resistor 14, and the source of DC voltage 16. The output pulse is terminated when the voltage at input B falls below the threshold voltage $V_0$ necessary to maintain the logic element's low output value.

Referring now to FIG. 3, a monostable multivibrator constructed in accordance with this invention is illustrated wherein the construction of NAND-gate 10 is disclosed in detail. As in FIG. 1, the pulse source 30 applies pulses between conductor 28 and ground to provide an input to a logic element 10 which has an output on conductor 19 related thereto.

The operation of the timing circuit comprised of capacitor 12, resistor 14, and the source of DC voltage 16 is the same for FIG. 3 as that described above for FIG. 1. Likewise, diode 18 is included for the reasons noted above. The basic operation of this monostable multivibrator is affected by the application of signals to inputs A and B and the resultant output pulses provided on conductor 19 are also the same as those discussed above with respect to FIG. 1.

The NAND-circuit 10 of FIG. 3 comprises diodes 32 and 34 connected between the inputs A and B and the base of transistor 36. The voltage applied to the base of transistor 36 is determined by the voltages at input terminals A and B. The Zener diode 38 determines the turn on point for transistor 36. The minimum voltage required at each of the gates A and B to effect turn on of output transistor 40 is the threshold voltage $V_0$ noted above and in FIG. 2C. When this threshold voltage $V_0$ is attained or surpassed at both inputs A and B, transistor 36 is rendered conductive. The voltage divider comprised of resistors 42 and 44 sets the bias condition for transistor 36.

When transistor 36 is conducting, a bias voltage is developed across the resistor 46 which causes the transistor 40 to conduct. When transistor 40 is operating in its conducting mode, the output from the NAND-gate 10 on conductor 19 is at its low output value corresponding to portion 22 shown in FIG. 2B. This follows since the voltage from the source of DC voltage 48 is dropped across resistor 50 whenever transistor 40 is conducting and the output is taken across the collector-emitter circuit of transistor 40 as shown in FIG. 3.

Accordingly, the NAND gate provides an output pulse whenever both the inputs are supplied voltage in excess of the threshold voltage. Hence, the timing circuit interposed between input B and the pulse source controls the duration of the output pulse when the pulse widths of the input pulses exceed the pulse width of the predetermined pulse width output pulse.

Although this invention has been described in terms of a NAND logic element 10, the scope of the invention is not to be construed as being restricted to logic elements of the NAND variety nor to NAND gates of the exact type shown in FIG. 3. Rather, it will be appreciated that this invention can be practiced with other logic elements which provide an output in recognition of the simultaneous existence of two input signals. For example, an AND logic element could be readily incorporated in place of the NAND element in the above development. It is preferred that the logic element be of the integrated circuit type characterized by small size and cost.

By way of summary, it should be appreciated that the pulse width of the predetermined pulse width output pulse can be varied by changing the parameter values for the resistive and/or capacitive elements which comprise the RC timing circuit. Additionally, if pulses having different amplitudes are applied, the pulse widths of the output pulses will vary accordingly in view of the operative dependence of the multivibrator on the exponential voltage variations associated with the RC charging circuit.

I claim:

1. A system for providing a series of output pulses from a train of input pulses wherein the pulse widths of the output pulses are equal to or less than the pulse widths of the input pulses, comprising: a logic gate means having an output and first and second inputs, said logic gate means providing an output signal when voltages exceeding a threshold voltage are simultaneously applied to said first and second inputs; a source of constant-amplitude input pulses having output terminals; means directly connecting one of said output terminals of said source of input pulses to said first input of said gate means; and an RC timing circuit connected across said source of input pulses with the capacitor of said timing circuit connected in series between said one output terminal of said source of input pulses and said second input of said logic gate means, said RC timing circuit causing the voltage applied to said second input of said logic gate means to decrease as said capacitor charges through the resistor of said RC timing circuit whereby, said logic gate means is switched by a leading edge of a pulse from said source of input pulses to initiate an output pulse and said output pulse terminates upon the termination of the input pulse or when the magnitude of the voltage applied to said second input terminal of said logic gate means decreases to a value below the threshold voltage due to the action of said RC timing circuit.

2. A system for reducing the pulse widths of a train of indeterminate pulse width constant-amplitude input pulses to provide a series of substantially constant pulse width output pulses, comprising: a logic gate means having an output and first and second inputs, said logic gate means providing an output signal when voltages exceeding a threshold voltage are simultaneously applied to said first and second inputs; a source of constant-amplitude input pulses having output terminals; means directly connecting one of said output terminals of said source of input pulses to said first input of said gate means; and an RC timing circuit connected across said source of input pulses with the capacitor of said timing circuit connected in series between said one output terminal of said source of input pulses and said second input of said logic gate means, said RC timing circuit causing the voltage applied to said second input of said logic gate means to decrease as said capacitor charges through the resistor of said RC timing circuit whereby, said logic gate means is switched by a leading edge of a pulse from said source of input pulses to initiate an output pulse, the width of said input pulse having such a magnitude that said output pulse terminates when the magnitude of the voltage applied to said second input terminal of said logic gate means decreases to a value below the threshold voltage due to the action of said RC timing circuit prior to termination of said input pulse.

3. A system for providing a series of output pulses having a substantially constant pulse width from a train of input pulses, comprising: a NAND logic gate having an output terminal and first and second input terminals, said NAND gate providing a low output value on its output terminal when voltages exceeding a threshold voltage are simultaneously applied its first and second input terminals; a source of constant-amplitude input pulses having output terminals; means directly connecting one output terminal of said source of input pulses to said first input terminal of said NAND gate; and an RC timing circuit comprised of a resistor and a capacitor connected across said output terminals of said source with said capacitor connected in series between said one output terminal of said source and said second input terminal of said NAND gate, said RC timing circuit causing the voltage applied to said second input terminal of said NAND gate to decrease as said capacitor is charged through said resistor whereby, said NAND gate is switched by a leading edge of a pulse from said source of input pulses to initiate an output pulse and said output pulse terminates when the magnitude of the voltage applied to said second input terminal of said NAND gate decreases to a value below said threshold voltage due to the action of said RC timing circuit.

* * * * *